Patented Feb. 17, 1931

1,793,138

UNITED STATES PATENT OFFICE

HEINZ SCHEYER, OF RIO DE JANEIRO, BRAZIL, ASSIGNOR TO GENERAL ANILINE WORKS, INC., OF NEW YORK, N. Y., A CORPORATION OF DELAWARE

NEW VAT DYESTUFF AND PROCESS OF MAKING SAME

No Drawing. Application filed April 11, 1929, Serial No. 354,434, and in Germany April 5, 1928.

My present invention relates to new vat dyestuffs and to a process of making them, more particularly it relates to compounds obtainable by treating a 2-aroyl-pyrazolanthrone, containing in the pyrazole ring the free imino-group and in the arylresidue a halogen atom in ortho-position to the ketogroup and corresponding probably to the general formula:

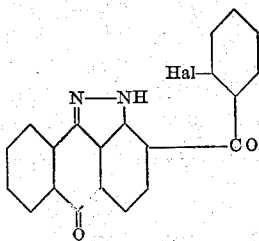

wherein the anthraquinone as well as the benzene nucleus may contain further substituents, with an inorganic substance of a feebly alkaline reaction, such as potassium acetate or carbonate of soda and so on, advantageously in the presence of a diluent and of a suitable catalyst such as copper powder. The formation of the new compounds probably takes place according to the following equation:

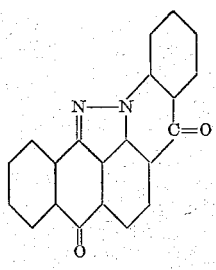

i. e. the hydrogen atom of the imino group and the halogen atom standing in ortho-position to the carbonyl group are eliminated together and form hydrogen halide, which is neutralized by the alkaline acting substance, and condensation takes place in the positions previously occupied by these substituents. The new dyestuffs corresponding probably to the general formula:

wherein the anthraquinone as well as the benzene nucleus may contain further substituents, are valuable new vat dyestuffs of a hitherto unknown structure. They form intensely colored powders soluble in concentrated sulfuric acid with a greenish color and dye cotton from a violettish vat pure shades of a good fastness.

The 2-aroyl-pyrazolanthrones used as starting materials for my present process are obtainable according to my copending application Serial No. 354,433 filed on the same date by acting with hydrazine on 1-halogenanthraquinone-2-carboxylic acids, converting the pyrazolanthrone-2-carboxylic acid thus formed into its chloride and condensing the latter with suitable halogenated hydrocarbons in the presence of an acid condensing agent.

In order to further illustrate my invention the following examples are given, the parts being by weight and all temperatures in centigrade degrees; but I wish it to be understood that my invention is not limited to the examples given, nor to the exact conditions stated therein.

Example (See Example 1 of my copending application of the same date.)

12 parts of dichloro-benzoyl-pyrazolanthrone are mixed with about 120 parts of nitrobenzene and 12 parts of dehydrated potassium acetate, 0,6 parts of copper acetate and 0,1 parts of copper powder are added. The mixture is heated to boiling for some hours in an apparatus provided with a reflux condenser, the liquor turning to a red color. When the reaction is finished the nitrobenzene is expelled by steam. The dyestuff thus obtained corresponds probably to the formula:

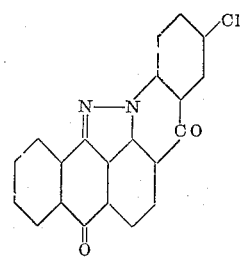

It forms a brownish red powder, which may be freed from some present starting material by treatment with an aqueous alcoholic caustic alkali solution. It crystallizes from toluene in the form of brick-colored crystals, soluble in sulfuric acid with a greenish color. It dyes cotton yellowish red shades from a violet vat.

When replacing in this example the dichloro-benzoyl-pyrazolanthrone by the corresponding amount of dichloro-toluyl-pyrazolanthrone a dyestuff of similar properties is obtained which corresponds probably to the formula:

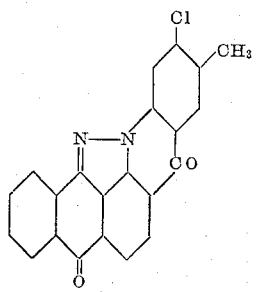

By the expression "inorganic substance of a feebly alkaline reaction" occurring in the appended claims, I mean an inorganic substance corresponding to an alkali metal acetate or carbonate in alkalinity. The term "copper catalyst" used in claim 3 is intended to include the metal itself as well as copper compounds.

I claim:—

1. A process which comprises treating a 2-aroyl-pyrazolanthrone compound of the probable general formula:

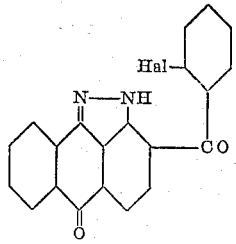

wherein the benzene nucleus may contain a methyl group or a further halogen atom or both these substituents, with an inorganic substance of a feebly alkaline reaction, whereby the hydrogen atom of the imino group and the halogen atom standing in ortho-position to the carbonyl group are eliminated and form hydrogen halide, which is neutralized by the alkaline substance, and condensation takes place in the positions previously occupied by these substituents.

2. A process which comprises treating a 2-aroyl-pyrazolanthrone compound of the probable general formula:

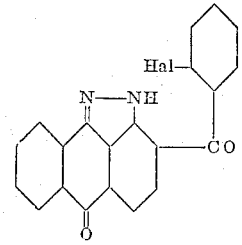

wherein the benzene nucleus may contain a methyl group or a further halogen atom or both these substituents, with an inorganic substance of a feebly alkaline reaction in a diluting medium while heating, whereby condensation takes place as set forth in claim 1.

3. A process which comprises treating a 2-aroyl-pyrazolanthrone compound of the probable formula:

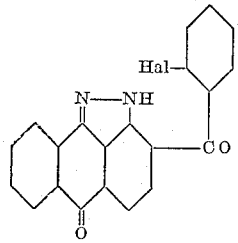

wherein the benzene nucleus may contain a methyl group or a further halogen atom or both these substituents, with an inorganic substance of a feebly alkaline reaction in a diluting medium and in the presence of a copper catalyst while heating, whereby reaction takes place as set forth in claim 1.

4. As new compounds vat dyestuffs corresponding probably to the general formula:

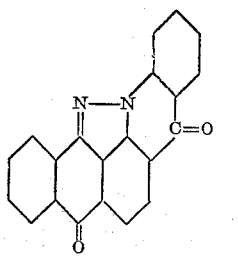

wherein the benzene nucleus may contain a methyl group or a halogen atom or both these substituents.

5. As a new compound the vat dyestuff corresponding probably to the formula:

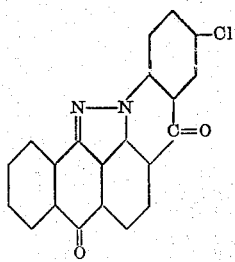

crystallizing from toluene in the form of brick-colored crystals, soluble in concentrated sulfuric acid with a greenish color and dyeing cotton yellowish red shades from a violet vat.

6. The process which comprises heating a mixture of about 12 parts of 2′.5′-dichloro-benzoyl-pyrazolanthrone of the formula:

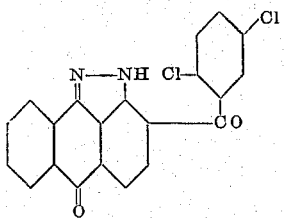

about 120 parts of nitrobenzene, about 12 parts of dehydrated potassium acetate, about 0.6 parts of copper acetate and about 0.1 parts of copper powder at a temperature up to the boiling point of nitrobenzene for some hours, whereby condensation takes place as set forth in claim 1.

In testimony whereof, I affix my signature.

HEINZ SCHEYER.